(12) United States Patent
Edney

(10) Patent No.: US 6,995,906 B2
(45) Date of Patent: Feb. 7, 2006

(54) PROJECTION UNIT

(76) Inventor: Guy Spencer Edney, Mall House, Faversham, Kent, ME13 8JJ (GB)

(*) Notice: Subject to any disclaimer, the term of this patent is extended or adjusted under 35 U.S.C. 154(b) by 67 days.

(21) Appl. No.: 10/363,877

(22) PCT Filed: Sep. 7, 2001

(86) PCT No.: PCT/GB01/04031
§ 371 (c)(1),
(2), (4) Date: Jun. 13, 2003

(87) PCT Pub. No.: WO02/21206
PCT Pub. Date: Mar. 14, 2002

(65) Prior Publication Data
US 2004/0057109 A1 Mar. 25, 2004

(30) Foreign Application Priority Data
Sep. 7, 2000 (GB) .............................. 0021989

(51) Int. Cl.
G03B 21/56 (2006.01)
G03B 21/22 (2006.01)
G03B 21/14 (2006.01)
H04N 5/64 (2006.01)
A47B 81/00 (2006.01)

(52) U.S. Cl. .................. 359/450; 359/460; 353/75; 353/79; 353/119; 312/10.1

(58) Field of Classification Search ................ 359/450, 359/460, 443; 348/788–789, 838–839, 841; 353/74–75, 79, 119; 352/104, 242; 312/10.1
See application file for complete search history.

(56) References Cited

U.S. PATENT DOCUMENTS

| 994,276 | A | * | 6/1911 | Reilly | 359/450 |
| 1,208,462 | A | * | 12/1916 | Boernstein | 359/450 |
| 2,225,012 | A | * | 12/1940 | Kallusch | 359/450 |
| 2,441,159 | A | * | 5/1948 | Lehman et al. | 352/104 |
| 2,617,328 | A | | 11/1952 | Stableford | 359/449 |
| 2,651,234 | A | | 9/1953 | Corso et al. | 359/450 |
| 3,205,771 | A | * | 9/1965 | Harrison et al. | 353/79 |
| 5,434,631 | A | | 7/1995 | Lieberman et al. | 353/119 |
| 5,510,862 | A | * | 4/1996 | Lieberman et al. | 353/119 |
| 5,745,293 | A | | 4/1998 | Lassalle | 359/614 |
| 5,796,443 | A | | 8/1998 | Kawajiri et al. | 348/839 |
| 6,109,767 | A | | 8/2000 | Rodriguez | 362/294 |

FOREIGN PATENT DOCUMENTS

| DE | 358995 | | 9/1922 |
| DE | 388888 | | 1/1924 |
| EP | 0 114 676 | | 8/1984 |
| EP | 0 766 125 | | 4/1997 |
| FR | 1311935 | | 11/1962 |
| GB | 1496210 | | 12/1977 |
| GB | 2380808 A | * | 4/2003 |
| GB | 2381149 A | * | 4/2003 |
| GB | 2388486 A | * | 11/2003 |
| JP | 81154222 | | 8/1996 |
| SU | 45806 | | 1/1936 |
| SU | 61708 | | 1/1962 |

* cited by examiner

Primary Examiner—Rodney Fuller
Assistant Examiner—Magda Cruz
(74) Attorney, Agent, or Firm—Greenberg Traurig

(57) ABSTRACT

A rear projection unit has a screen mounted in a frame which supports a projector at a desired position in relation to the screen. The projector can thereby be positioned in various ways and the frame reduced and enlarged according to the requirements of the projection unit. The projection unit has a tapering shape and light absorbing material so that internal reflections are minimized and light absorption is maximized to enhance clarity of the screen. The frame itself is configurable with the arms being pivotable and extendable. A light absorbing material is stretched over the frame and a fan included to cool a projector within the unit and draw air into the unit through the material thereby serving the dual purpose of cooling and filtering air. A new material for absorbing light is also provided.

27 Claims, 11 Drawing Sheets

SIDE VIEW

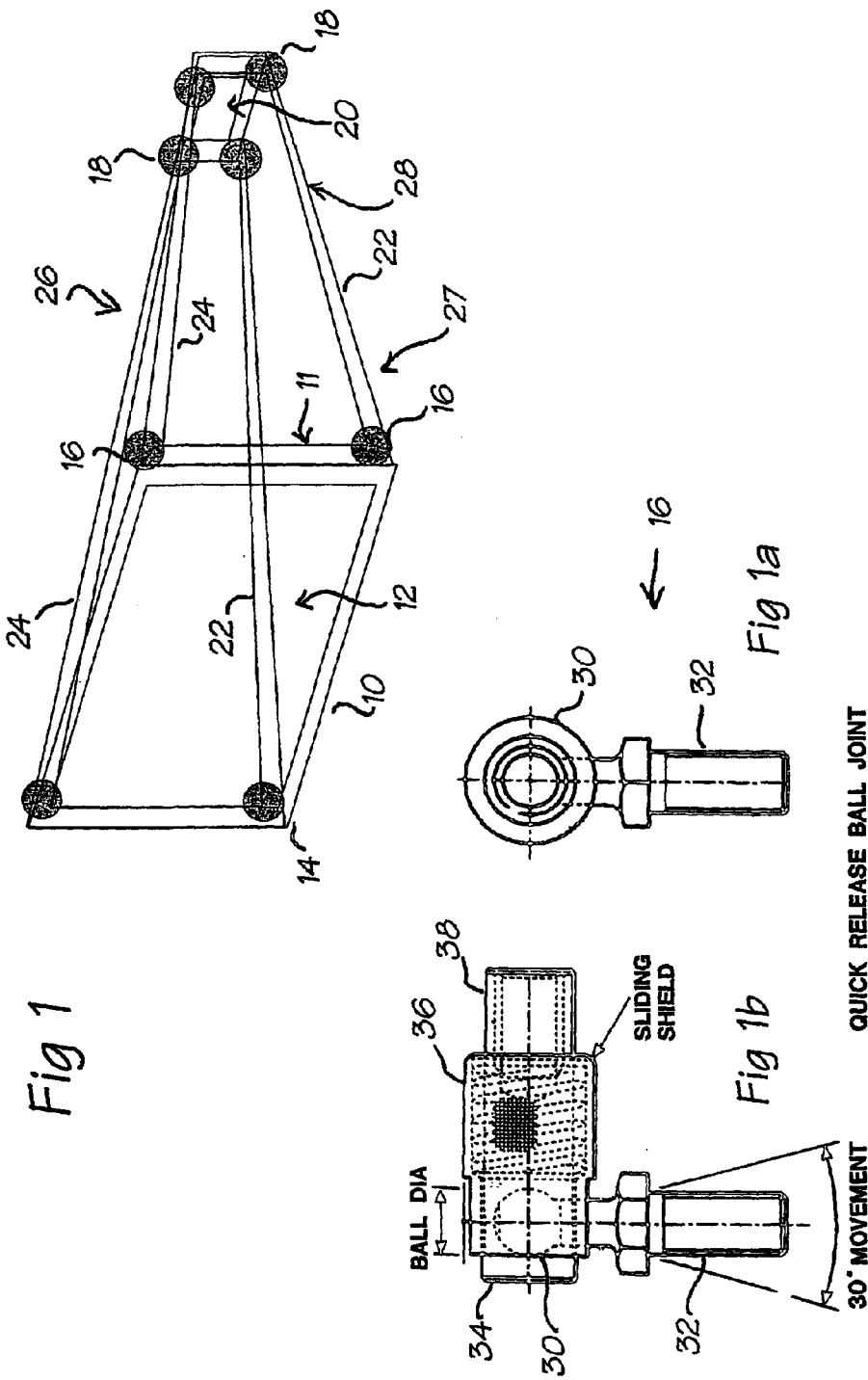

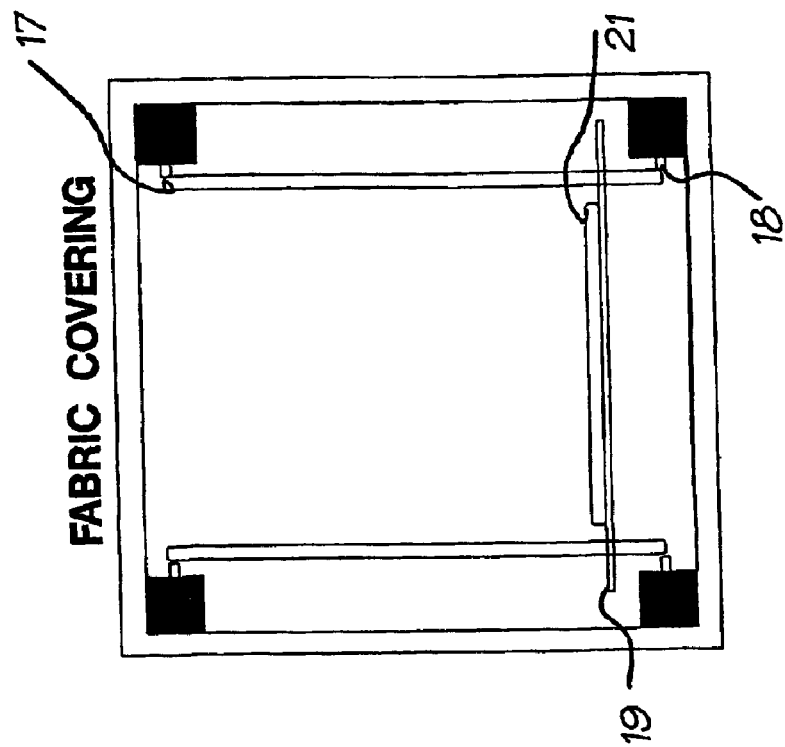
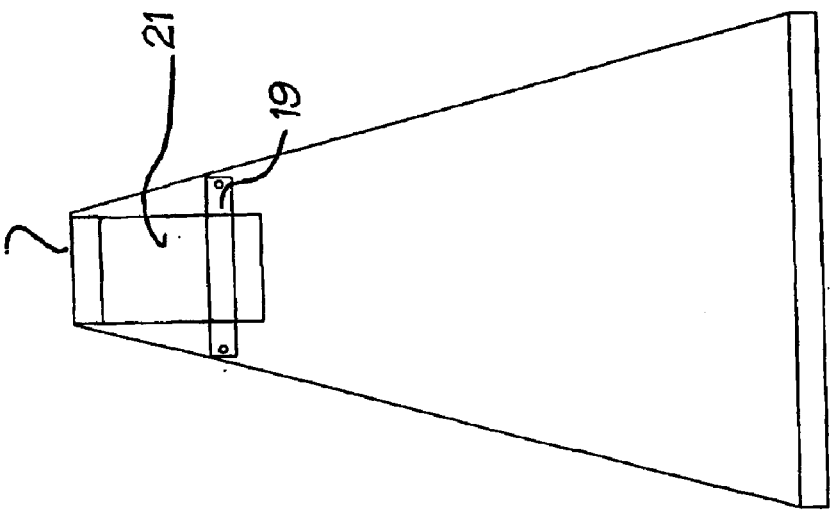

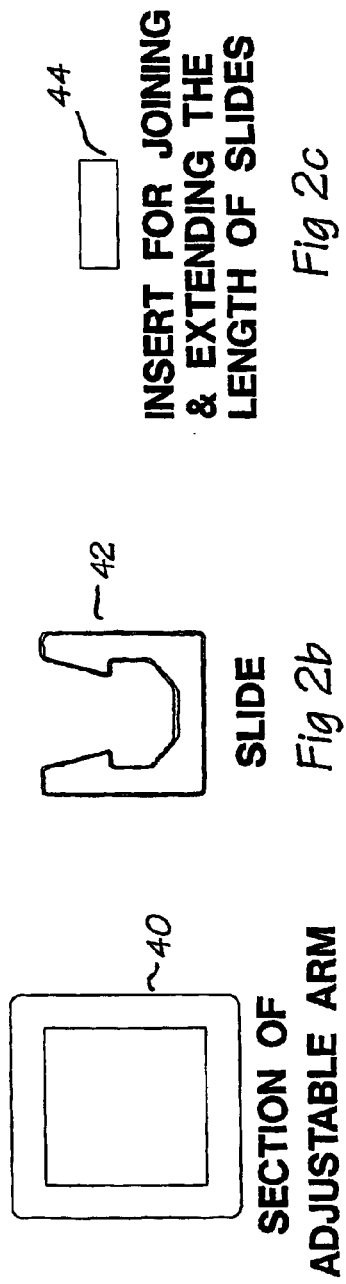
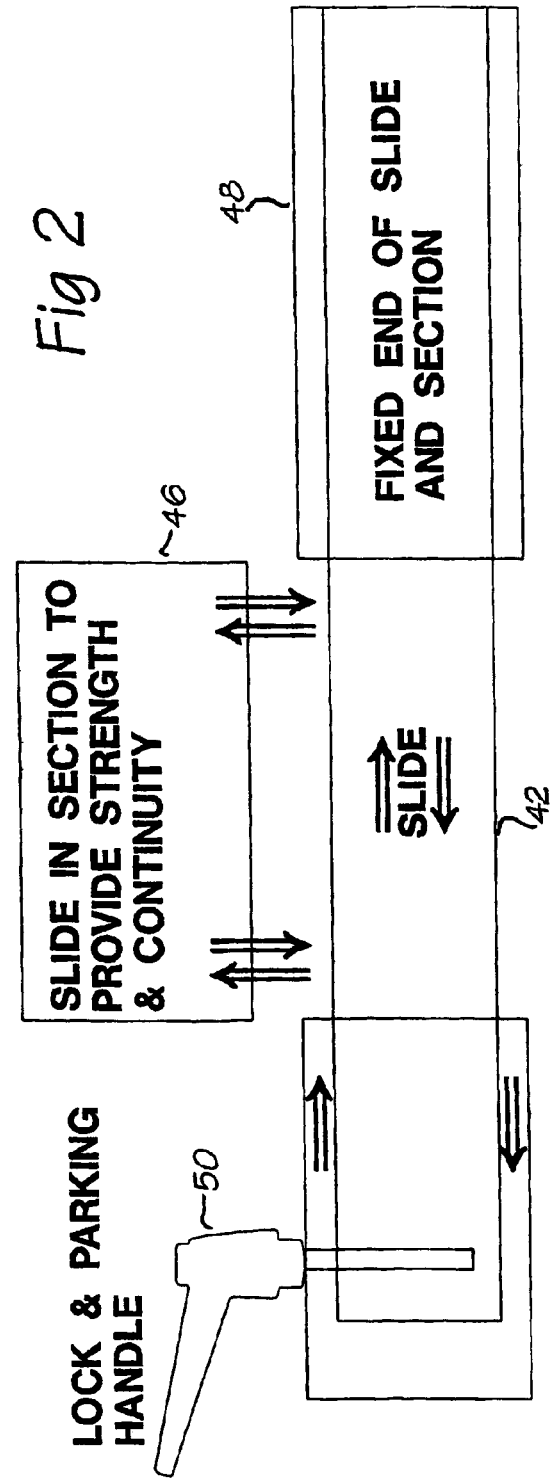

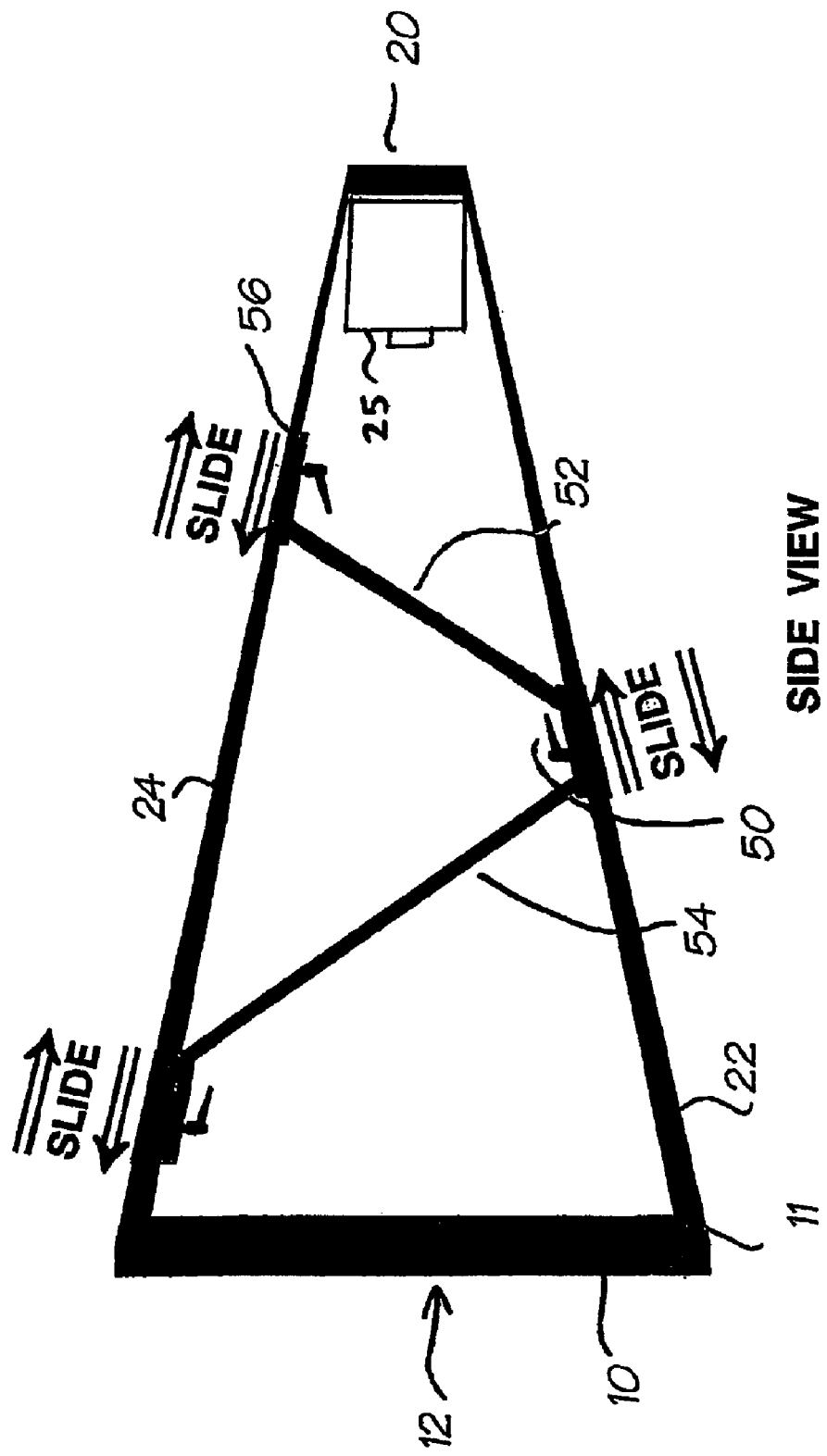

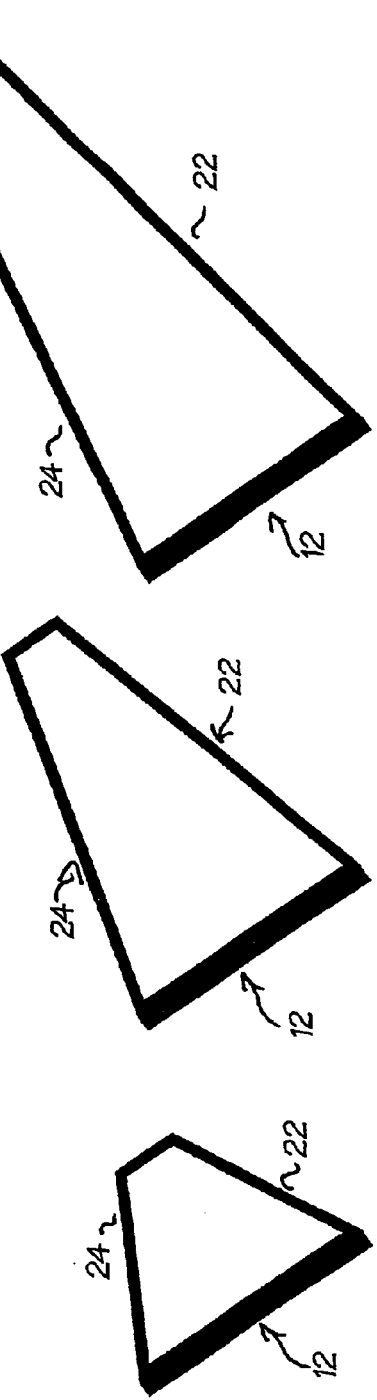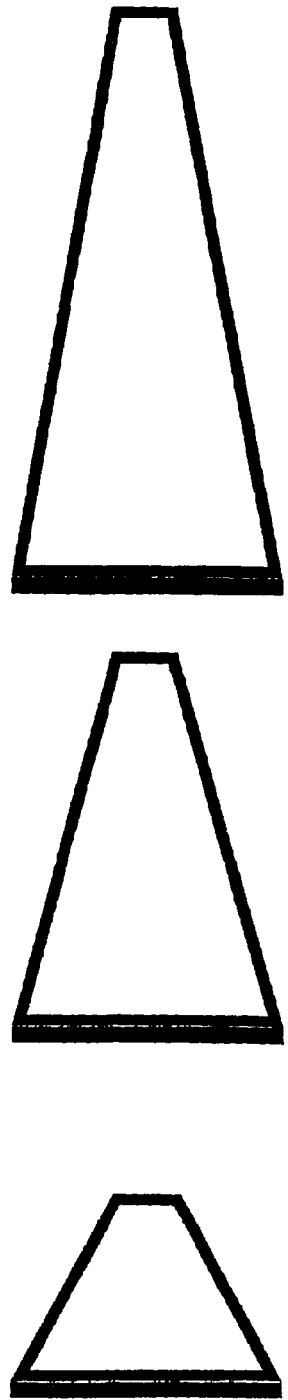
Fig 5
SIDE ELEVATIONS SHOWING LENGTH ADJUSTMENT APPLICABLE TO DEAD SCREEN CENTRE & OFFSET PROJECTIONS & ALL SYSTEMS.
PLAN VIEWS OF LENGTH CHANGES

LIGHT ABSORBING SYSTEM.

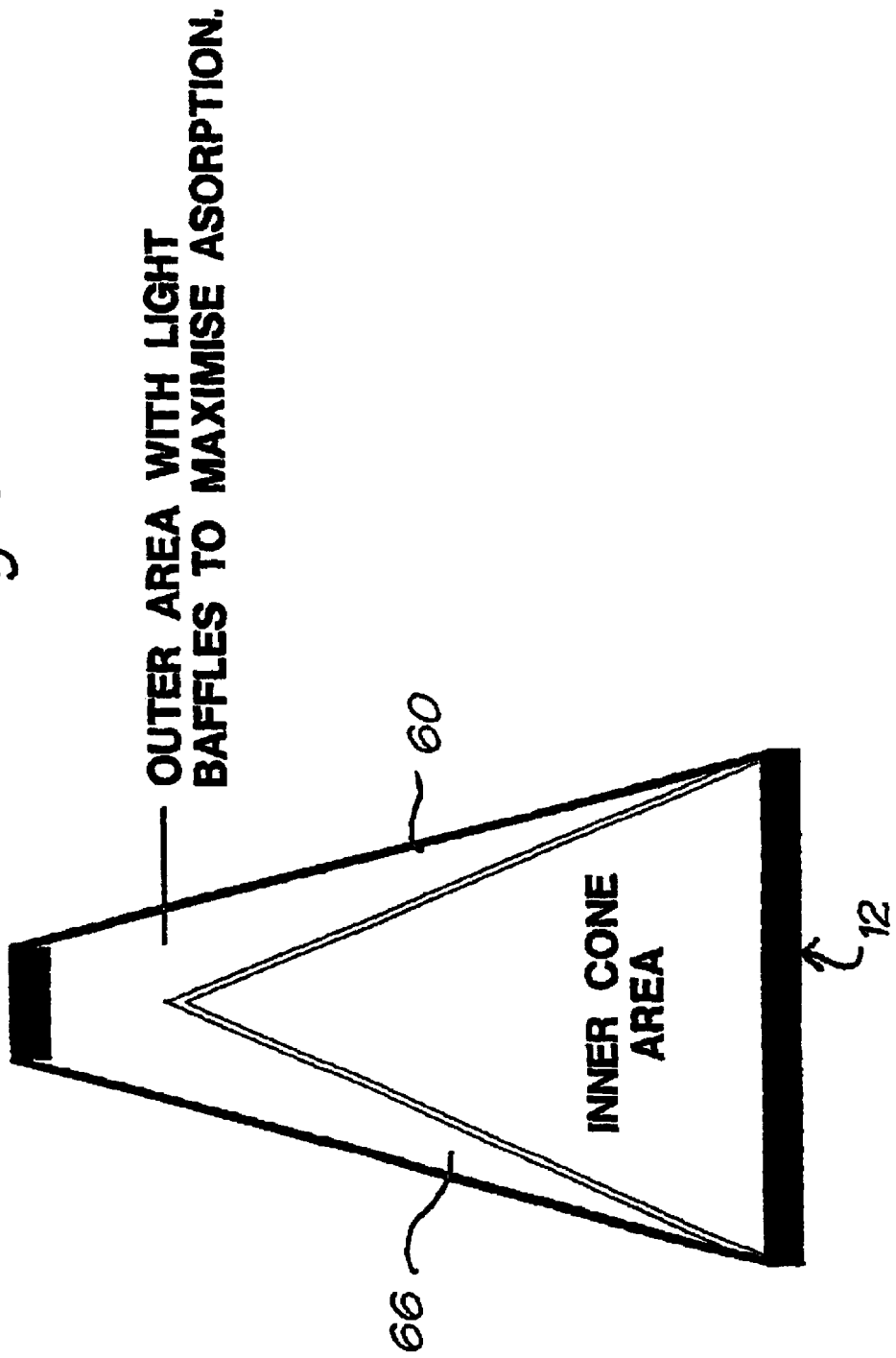

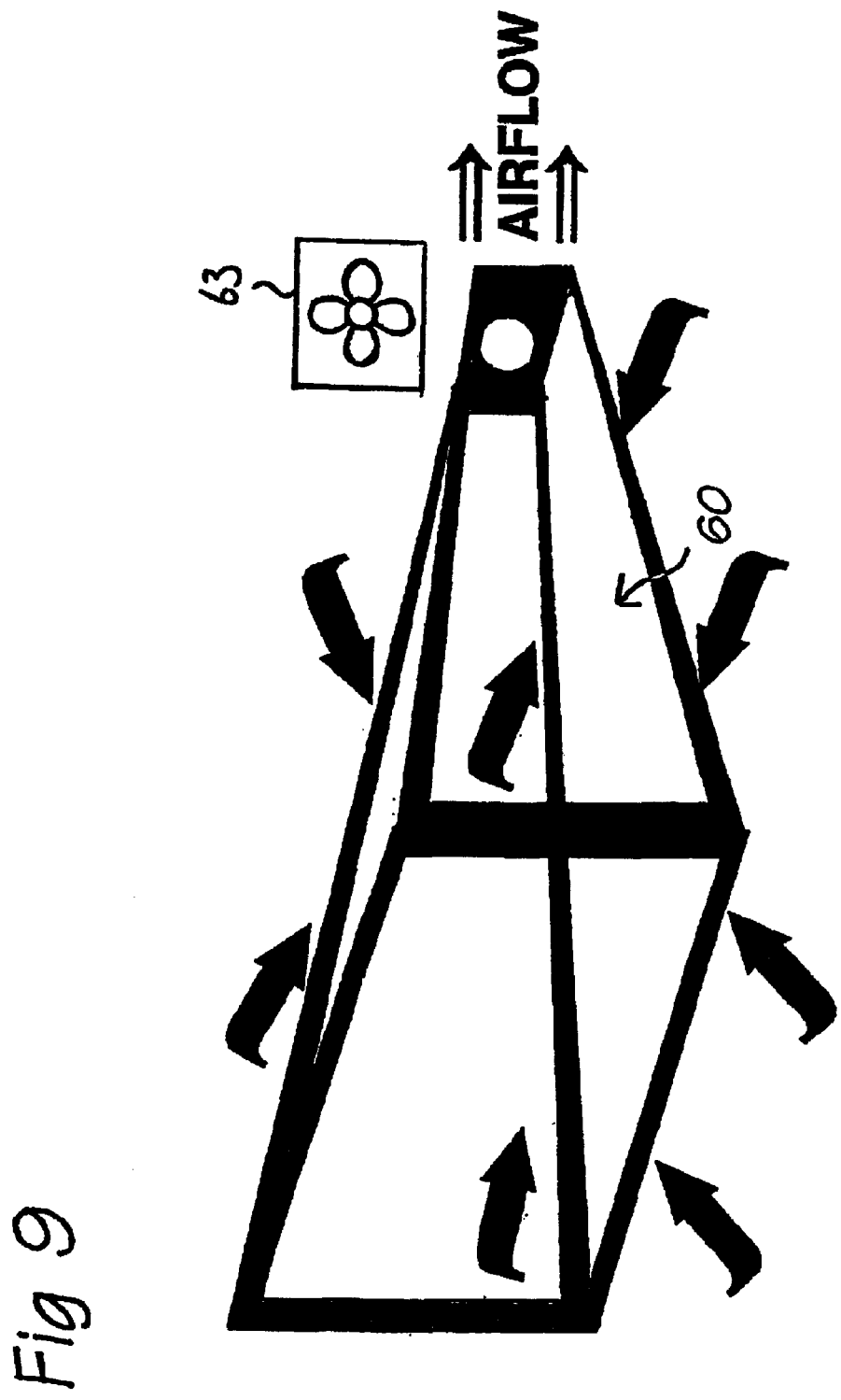

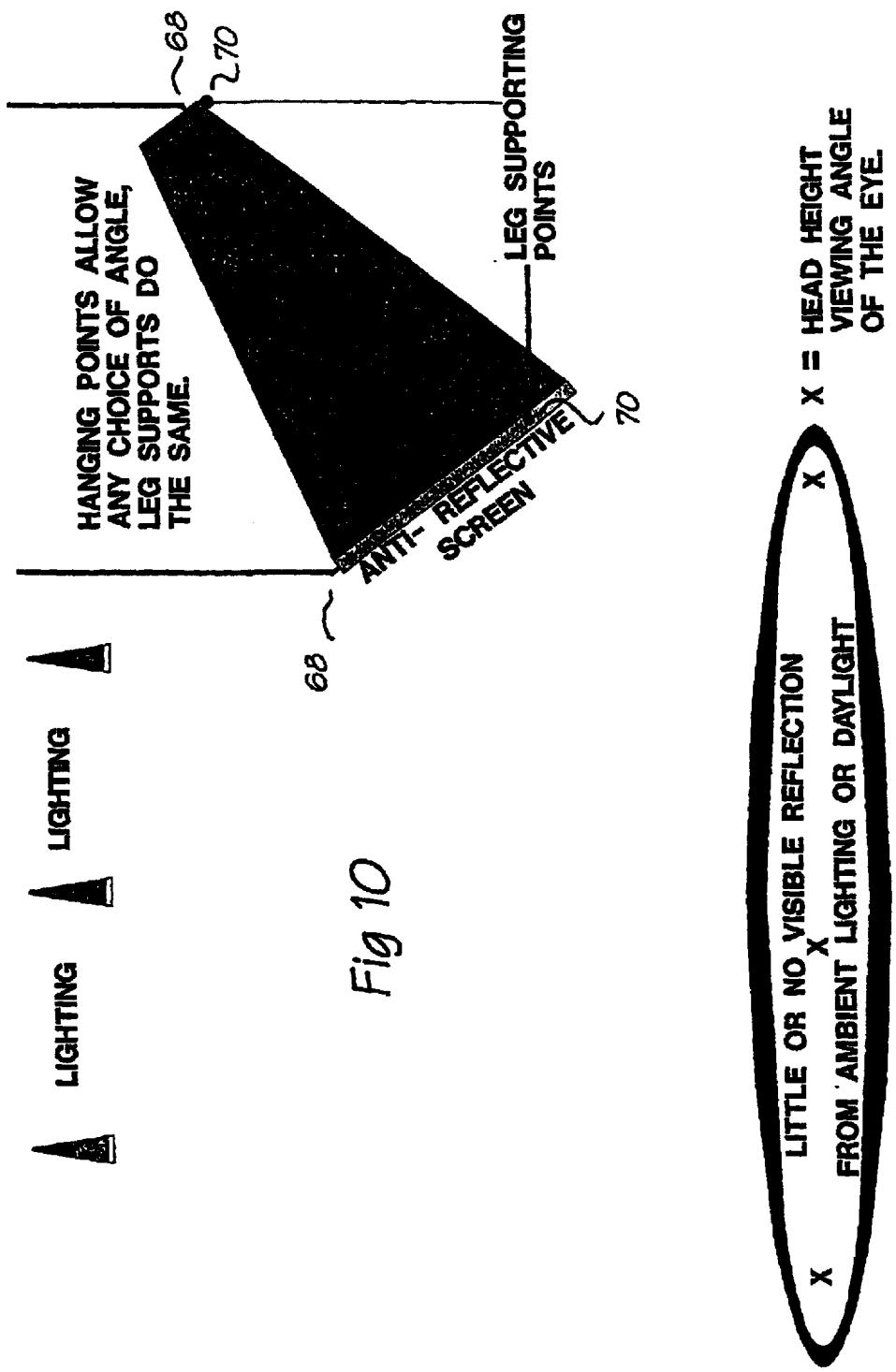

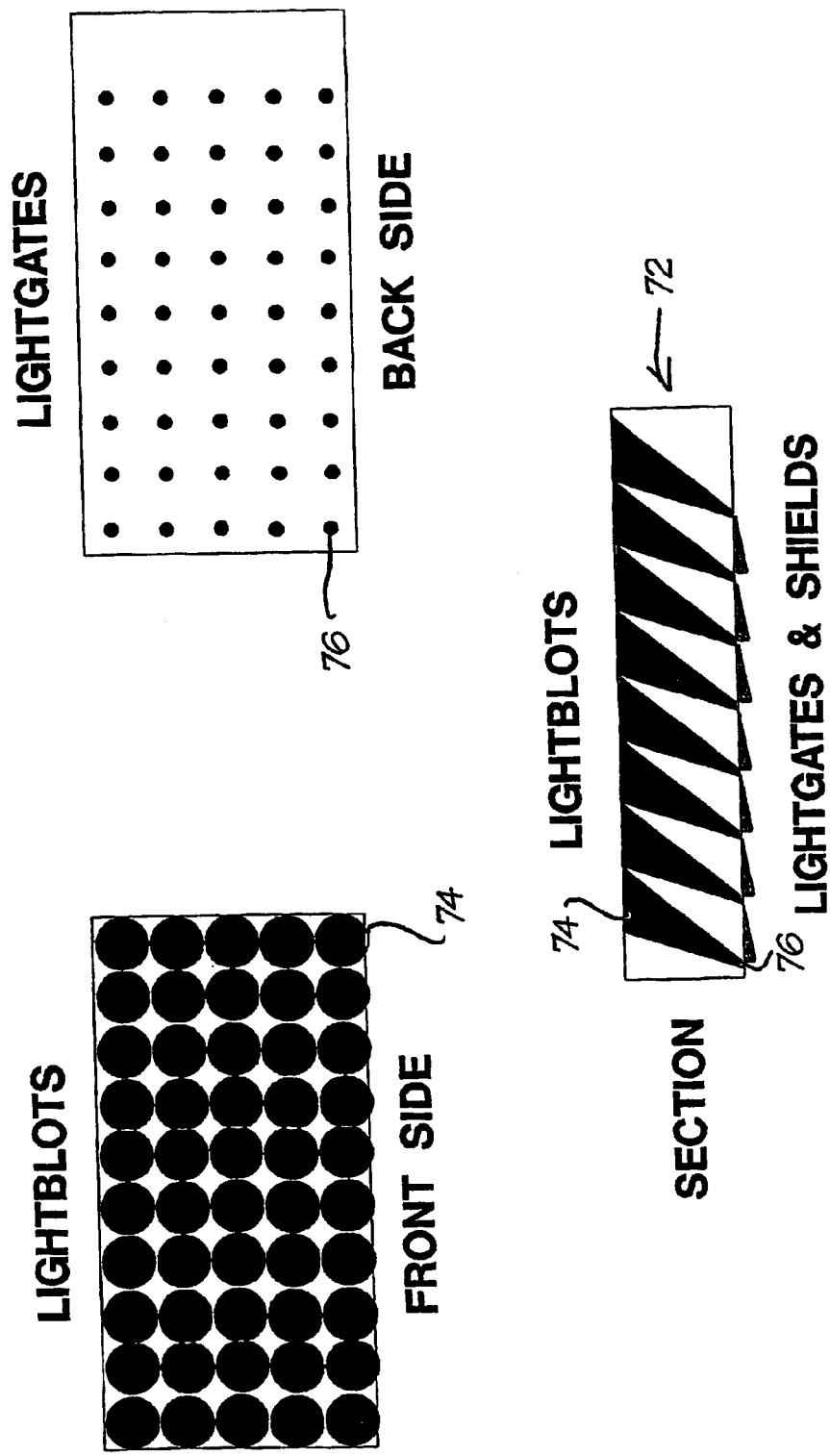

PROJECTION UNIT

FIELD OF THE INVENTION

The invention relates to a projection unit, and in particular to a rear projection unit.

BACKGROUND OF THE INVENTION

For many years companies have required back/rear projection booths/rooms to shown their Corporate Films, Slides and Videos to assembled audiences. Traditionally these projection booths have been purpose built, constructed from a selection of building materials, and these back projection booths have been used at exhibitions, Station Presentations and "in house" in Training rooms, Boardrooms, etc.

The requirement for the installation of Back/rear projection booths/rooms are dependant on the application and the constraints of the space available. They are therefore usually designed and built on a "one off" basis and generally comprise of a number of disparate elements combined together to form the booth. These disparate elements would normally comprise 4 walls, a ceiling and a floor, with a large hole cut in one wall, to allow the insertion of a rear projection screen, through which the projected image is seen, a projector and lens, and some electronics including an electrical power feed and a playback and sound system.

Located somewhere within the booth/room is a film, slide or Video Projector, usually mounted in a separate projector stand, sometimes directly pointing at the screen, sometimes indirectly via a mirror. Mirrors are usually installed, to provide the correct projection distance, when the depth of the room is insufficient to allow for direct projection onto the screen. The projection distance being determined by the size of the image required, together with the projection lens being used. These booths/rooms are generally square or rectangular. The projection screen surfaces are made from various translucent materials with varying tints in an attempt to improve contrast ratios sacrificing projected light as a result.

It is usual for film, slides and video to be viewed in a darkened room just like the Cinema, thereby removing the possibility of any ambient light interfering with the projected image. The darkening of the room also has the effect of increasing the perceived brightness and the contrast of the projected image because the pupil inside the eye of the viewer, enlarges, to allow more light to fall on to the retina of the eye, which increases the perceived brightness of the projected image to the viewer. Perceived brightness to the Human eye is very dependant on the overall contrast between Black and White. As a general rule the blacker the blacks, the brighter the image to the eye.

Other than the purpose built rooms described above, the market of single integrated rear projection systems is entirely confined to the small display market with vertical/upright screen diagonals up to 55". The most common vertical/upright sizes are in the 40"–45" screen diagonal range. However, and without exception, all these integrated projection systems are indirect projection systems and all feature vertical/upright screens, i.e. they all use varying types of optical mirrors/reflection surfaces between the projector and the vertical/upright screen surface.

There are no direct projection systems within the integrated projection display markets. All other larger, direct or indirect, rear projection systems are found in very high cost, purpose built installations only, and where proper viewing of the vertical/upright screens can only be properly viewed in low ambient light levels.

We have appreciated a number of problems with existing rear projection units.

First, inside buildings, the amount of ambient light from fixed position lighting being reflected off the front surface of the screen into the eyes of the assembled viewers, makes the projected image difficult, uncomfortable and in some instances impossible to view. Outdoors, the same problems exists to a much greater degree due to the high daylight levels of ambient light.

Second, the amount of ambient from fixed position lighting and the general ingress of external natural ambient light, in the viewing area travelling through the translucent screen into the "projection area" and which then travels around the projection area and back out with the projected image, results in "washing out" the projected image. The net result is that the image is difficult, if not impossible to view. Inside a projection unit, a certain amount of the light from the projected image is reflected off the internal side of the translucent screen back into the internal "projection area". This additional, randomly reflected, light mixes with the incoming ambient light and travels around the projection area passing out through the screen with the image, thus increasing the "washing out" effect.

Third, vertical/upright screens, which are not centred at head height and in line with the assembled viewers eyes, create considerable additional problems due to the "off centre" viewing angles. These "off centre" viewing angles create additional bright and dark screen areas (various known as hot and cold spots etc.) because the viewers eyes are not directly in alignment with the projector and the projected image, being always offset due to the fact that the screen is in the vertical/upright plane.

Fourth, rear direct/indirect projection systems suffer from air borne atmospheric dust/pollution which causes the optics to become coated with air borne grime which causes light loss, and further, the projected light that is emitted from the optics is caused to refract in the air between the point of exit from the projection optics and the rear of the screen material. This internal air refraction downgrades the clarity of the projected image.

Lastly, in general, we have appreciated the need for a rear projection unit which does not require a purpose built room.

SUMMARY OF THE INVENTION

In a broad aspect, the invention provides a rear projection unit comprising a screen for viewing from a front side and a frame attached at the rear side of the screen, the frame having a front portion proximate the screen and a rear portion away from the screen, the rear portion including a mounting for mounting a projector at a desired position in relation to the screen.

The invention provides a convenient projection unit in contrast to known purpose built booths/rooms. The use of a frame and a mounting is generally more convenient than providing a separate podium or mirror arrangement within such a purpose built booth/room. The invention could be fitted to an existing back projection facility or be made as a new unit.

The invention also resides in various key aspects which each provide further advantages, as follows.

In one aspect, the frame comprises a plurality of configurable arms, the arms being moveable to change the position of the mounting for the projector with respect to the screen.

This second aspect of the invention provides a significant advantage in allowing the unit to be used with a variety of different projectors and screen sizes/shapes. The arms can simply be configured as required to change the position of the projector. This aspect includes various further preferred features including pivotably mounting the arms, providing extendable arms, and particularly arranging the connector points at the rear of the arms to define a shape of the same aspect ratio as the connection points at the front. This ensures that the mounting attached at the rear can keep the projector centrally with respect to the screen as the arms are varied in length, provided that the arms remain of equal length. The unit can thus be enlarged or reduced without requiring recalibration.

In another aspect, the unit includes a light absorbing material arranged to define a main cavity within the frame bordered by the screen at one side and the light absorbing material on other sides. The light absorbing material further ensures extraneous light within the cavity is not emitted through the screen. In conjunction with the first aspect, a light absorbing cavity is produced. A second light absorbing material defixes an inner cavity within the main cavity. Within this aspect, preferred features include the use of baffles and additional light absorbing cavities. In particular, an inner cone of light absorbing cloth from the projector to the screen enhances light absorption.

In a further aspect, the unit further comprises the third aspect and an extraction fan arranged to draw cooling air over a projector within the main cavity and to expel air from the cavity thereby drawing air into the main cavity through the light absorbing material, whereby the air passing over the projector is filtered through the light absorbing material. This provides particular benefit in using the light absorbing material for light absorption and air filtration. A cavity which absorbs light and is substantially free of dust particles is thereby produced. These and other features are set out in the claims.

A further, separate, aspect relates to a new light absorption arrangement. This arrangement can be used in conjunction with any of the proceeding aspects, or independently, for example in other projection systems. This aspect comprises a light absorption arrangement comprising a generally light absorbing material having a plurality of first openings on a first surface each communicating with a second smaller opening in a second surface, and having an internal surface between each first and second opening, whereby at least a portion of light impinging on the first surface passes one or more first openings, is partially absorbed and partially reflected on the internal surface and directed by the internal surface out of the second smaller opening.

In essence, the material forms a light trap to absorb as much light as possible, and direct any unabsorbed light away from the first surface. The material can be arranged to form a cavity with the first surface on the inner side, thereby absorbing light within the cavity and directing unabsorbed light out of the cavity. Preferably, each first opening, second opening and internal surface forms a generally conical shape.

In an embodiment, the frame tapers from the front portion to the rear portion. This shape in itself provides an advantage that extraneous light within the frame is directed generally towards the rear portion away from the screen by reflection within the cavity defined by the frame. In addition, as light is directed in this way, there will be multiple reflections, at each of which some light will be absorbed thereby reducing the extraneous light within the cavity of the frame. This light absorbing characteristic of the shape is also enhanced by further aspects.

BRIEF DESCRIPTION OF THE FIGURES

An embodiment of the invention will now be described, by way of example only, in which:

FIG. 1: is a perspective view of a rear projection frame embodying the invention;

FIG. 1a: is a cross section of a ball joint as used in the frame of FIG. 1;

FIG. 1b: is a cross section of the ball joint of FIG. 1a received in its housing;

FIG. 1c: is a plan view of a shelf support;

FIG. 1d: is a cross section view of a shelf support;

FIG. 2: is a schematic view of an extendable frame member as used in the frame of FIG. 1;

FIG. 2a: is a cross section of an adjustable arm as used in FIG. 2;

FIG. 2b: is a cross section of a slide used in FIG. 2;

FIG. 2c: shows an insert as used in FIG. 2;

FIG. 3: is a cross section of the projection frame with cross braces;

FIG. 5: shows a further series of side elevations showing adjustment of the length of the frame;

FIG. 8: shows a further light absorption arrangement;

FIG. 9: shows the air filtration system;

FIG. 10: shows a projection frame in use; and

FIG. 11: shows a further light absorption arrangement.

DESCRIPTION OF AN EMBODIMENT

Figure 4:
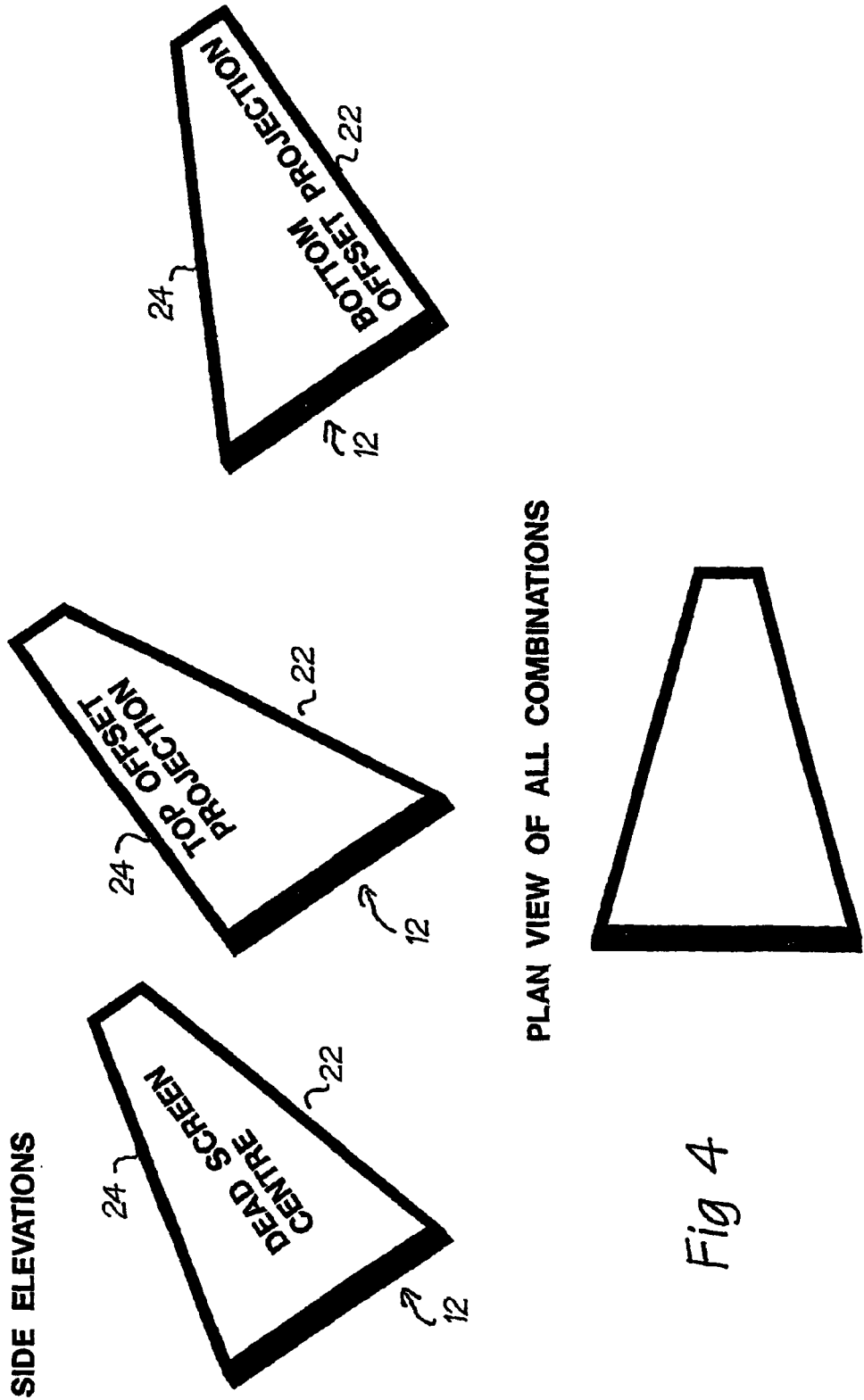
FIG. 4: shows a series of side elevations with the frame in different configurations.

The main components of a rear projection unit embodying the invention are shown in FIG. 1. This comprises a screen 12 which can be any generally translucent back-projection screen which can be a double glazing style with anti-reflective surface acrylic tinted mounted alone, or in conjunction with a soft PVC type mounted behind. Other possibilities include using the screen as a flat panel style loudspeaker. These are all within the scope of the invention.

The screen 12 is fitted within a surround 10 which comprises a light weight modular, constructional section aluminium anodised structure which can be made/adjusted to create any shape or size of screen such as, triangular, square, rectangular, hexagonal etc., and in any aspect ratio. The surround 10 is completely modular having quick release corners which are mitred and clamped. The sides of the screen surround 10 have provision for supporting hanging eyes to be inserted to allow for the suspension of the unit above/below an assembled viewing audience, which when used in conjunction with a rear hanging eye allow screen surface to be angled down/up towards the viewing audience. This feature allows the unit to be mounted to achieve "on centre" viewing angles, and the offset angle of the screen surface to all sources of localised ambient light eliminates/minimise screen reflection as would have otherwise been seen by the viewer. Such ambient light reflections would have had the effect of washing out the image, so that it would not have been seen by any viewer of the screen.

Supporting the screen surround 10 is a structural foundation 11. This is a light weight modular, rear screen constructional aluminium foundation supporting framework which is attached all the way round the rear of the screen surround. This supporting framework forms the constructional foundation of the unit and the remaining rear framework of the unit is attached at the corners thereof. A rectangular screen has 4 corners and attachments, a triangular 3, a hexagon 6 and so on. The design is also self supporting to ensure that components of the system cannot become dislodged and dangerous. The sides of the supporting framework screen have provision for the attachment of supporting legs (not shown). These attachments provide supporting leg swivels to allow the screen to be angled down/up towards the viewing audience, when also supported by a rear leg. The screen can also be angled via a combination of either 2 front legs with the rear hanging, or with the front hanging and the rear supported by a single supporting leg.

The projection unit has a frame 26 having a plurality of arms, in this case a pair of upper arms 24 and a pair of lower arms 22. The frame could be arranged with planer sections, but arms are preferred for the advantage of configurability. The frame 26 has a front portion 27 nearer the screen and a rear portion 28. The front portion 27 is attached to the screen foundation 11 itself supporting the screen 12.

Unlike any other systems available today the frame 26 is a cone/pyramid shape, with the rear portion 28 tapering from the front portion 27. This is created by the 4 framework arms 22, 24 required, (4 on a rectangular screen, 3 on a triangular screen and so on), from the 4 corners of the screen surround 10, and has been specifically designed to ensure that at all times, all the incoming ambient light/daylight entering through the front projection screen 12, becomes completely directional by being constantly reflected (in one direction only) down the inside of the framework system towards the rear of the framework and thereby absorbed. The cone/pyramid shape of the rear framework has also been specifically designed to ensure that at all times, any and all of the projected image/light being reflected off the inside surface of the projection screen also becomes completely directional by being constantly reflected (in one direction only) down the inside of the framework system towards the rear of the framework and absorbed.

The shape in itself thus provides the advantage of reducing the problem of light from within the unit emitting from the front screen other than the intended picture. A variety of shapes in which the rear portion 28 is tapered from the front portion 27 are possible, but a square based truncated pyramid is preferred.

The frame includes ball and socket joints 16 at front 14 and rear 18 corners attaching the frame 26 at the front to the screen foundation 11, and at the rear to a rear section 20. The quick release ball and socket joints are further shown in FIGS. 1(a) and (b).

The modular quick release, demountable, ball joints are positioned at each corner of the light weight modular, rear screen constructional foundation, framework. It is these ball joints that allow the rear framework to function as an adjustable and very flexible cone. This feature allows complete variation in the three dimensional position of the all arms' angles to the front screen, as any change in projection distance (length) or in the size of the rear projection platform necessitates that the three dimensional position of all the framework arms is changed. This feature effectively facilitates the use of any type of projector with any type focal length lens, or configuration of lenses, or the use of multiple projector set ups, multi-media, etc.

The modular adjustable arms 23, 24 of rear screen framework run back from the screen surround foundation 11, to a rear projection platform. These adjustable supporting framework arms are attached at rear projection platform by quick release ball joints in the case of screen centre projection systems, or by a combination of ball joints or ball hinges for offset projection systems.

The rear section 20 is shown in more detail in FIGS. 1c and 1d. The rear section 20 comprises a vertical panel to which a shelf 21 is attached protruding into the cavity of the unit. The shelf 21 is supported at the front by a cross support 19 which itself is attached to studding 17 supported at each corner by attachment to the ball joints 18. The cross support 19 is slidably attached to the studding 17 to allow the shelf to be positioned as necessary to support a projector 25.

The ball joints 16 shown in FIGS. 1(a) and (b) comprise a ball head 30 and ball stem 32. The ball head is received in a ball housing 34 such that the ball stem 32 is displaceable through an angle, such as 30° from one side to another in any direction. The ball coupling includes a slidable shield 36 mounted on a section 38 of the foundation 11 (at the front) or rear section 20 (at the rear).

The arms themselves of the frame are further shown in FIG. 2. The modular adjustable arms 22, 24 of the framework 26 cater for different projection distances as dictated by the physical characteristics of screen size and aspect ratio, together with the lens type and focal length. The adjustable arms work on the principle of releasing a locked internal aluminium slide 42 which is locked within the special rectangular aluminium arm section 40, which in moving out/in expands/reduces the overall length of the adjustable arm. Inserts 44 are used to extend the arms.

To maintain the overall strength and clean lines of the unit, sections of the special rectangular aluminium arm 46 are re-inserted/removed from in the gap from a fixed end 48 created by the movement of the sliding section. Once the desired length of the adjustable arm has been fixed the slide together with the re-inserted/removed sections are re-locked using a handle 50, thereby creating a solid structural component of the correct length.

It should be noted that the keeping of all modular arms to the same length will automatically ensure that any projector mounted on an appropriate rear projection platform or section 20, which has the same aspect ration of the projection screen, will effectively place the projector's lens at the horizontal and vertical "screen dead centre". The ability to extend/retract the modular arms facilities the use of all types of projectors, whether of the "screen dead centre" variety or those projection systems that have been designed to be offset, but require a vertical screen centre. The frame structure of upper 24 and lower 22 arms could be sufficient to support the screen and projector. However, further bracing is preferred, as shown in FIG. 3.

A supporting, and locking framework is required for maintaining the strength, stability and particularly the correct position of all the adjustable arms, as this ensures that all supporting components are kept precisely in the same plane, and in "square" to the front screen. Even if the adjustable arms are of the same length they will only guarantee to place the projector lens at the screen dead centre and to provide true alignment if they are in square with the front projection screen, i.e. the rear projection platform mounting is perpendicular to the projection screen, and the rear face or vertical section 20 of the projection platform is upright and parallel to the projection screen. Out of square arms, whilst being of the same length, can place the projector lens out of true alignment. Thus stabilising brace arms 52, 54 are provided.

Each positioning and stabilising arm 52, 54 creates an adjustable and locking "V" shaped cross brace, which joins 2 adjacent adjustable arms 22, 24. Usually there is 1 supporting "V" brace for each adjustable arm forming the pyramid type shape frame 26. Each adjustable positioning and stabilising arm comprises a centre plate 56 which can be locked via a Kipp handle 50/or other type of positionable handle, in any appropriate position on any adjustable arm. Off each adjustable centre plate are 2 swivel arms, attached by screws, and located at the ends of which are attached 2 further smaller positioning plates 56 with locking handles 50.

One such adjustable and lock "V" shaped arm is fitted to each side of the pyramid with the centre plates and 2 positioning plates being locked onto the 2 side arms via a Kipp handle/or other type of positionable handle. This action has the effect of creating parallel arms to the sides of the pyramid. Once all sides of the pyramid have been locked the pyramid becomes a solid structure. The adjustment flexibility of the "V" shaped positioning and stabilising arms will always fit the pyramid framework 26 irrespective of how much the modular adjustable arms 22, 24 of the framework have been adjusted. It should be noted that every adjustment in the length of the adjustable arm creates a different rear screen angle for each adjustable arm, and this positioning and stabilising arm solves this problem.

The "V" shaped locking arms will also fit all units set up for offset projectors or those systems housing 2 or more projectors.

Additional arm support could also be provided (not shown) located towards the very rear of the unit are 2 or more vertical platform supports which are attached to the adjustable arms. These supports comprise adjustable length studding to cater for the different angles and variances in distances caused when an adjustable arms is extended or reduced. This vertical studding is attached to the arms via quick release ball joints. The vertical studding allows for the use of screen centre projectors as well as those projectors that are offset. The purpose of this studding is to provide additional vertical stability at this point of the pyramid whilst also providing the front most supports for the projection platform, in addition the studding also provides for a left and right levelling adjustment of the projection platform, so that the projection platform remains parallel with the screen surround.

Additional mounting points of studding could also be built into the system to allow for the use of additional projectors within the same system. Also the mounting points for the studding/shelf support for projection platform, allow for the system to be used on it's side or upside down. When the screen is in a standard normal rectangular landscape format and when it is subsequently turned on it's side it creates a portrait or poster type format projection.

A projector may be mounted on a projection platform (not shown) which itself is fixed to the rear section 20. The rear section 20 is a panel which has the same aspect ratio as the front screen, but other configurations and sizes could be used. To obtain the benefit of automatic centering of the projector, it is simply required that the rear section 20 maintains the ball joints of the rear portions of the arms 28 in the same aspect ration as the ball joints of the front portions of the arms 27.

The projection platform thus forms the rear of the unit and comprises a rear vertical section 20 and projection platform on to which projector(s) are mounted. The rear unit is attached to the adjustable arms via quick release ball joints.

The shape, aspect ratio of the rear vertical section is usually in the same aspect ratio as the front projection screen albeit being much smaller in size, as this helps to ensure that the projector's lens is always situated at the "screen dead centre", with those projectors that require this feature, or is the vertical ce centre for offset projectors. The front of the projection platform is attached to the framework via a slotted shelf support which attaches to the vertical studding and which provides the necessary levelling requirement for every projector. A projection platform may have a number of projection shelves, either the normal horizontal shelf or shelves, and/or vertical shelves to allow for the installation of any number of projectors 2, 3, 4 or more projectors can be housed within the rear system.

The projector(s) are bolted to the projection platforms via a swivel adjustment. Once the projectors are bolted in position it may be necessary, once they have been switched on, to move the projected image left or right to fit the screen. This is not a problem associated with focus but a problem associated with optics mounted within the projector, as even small misalignments will appear out true with the screen.

The 3 dimensional adjustments of the projected image are achieved by:
1) the swivel adjustment which allows left and right adjustment,
2) the shelf studding adjustment which allows top to bottom image shift,
3) the shelf studding adjustment also allows parallel image shift to precisely match the image to the screen.

Examples of the configuration of the frame are shown in FIGS. 4 and 5.

Figure 7:
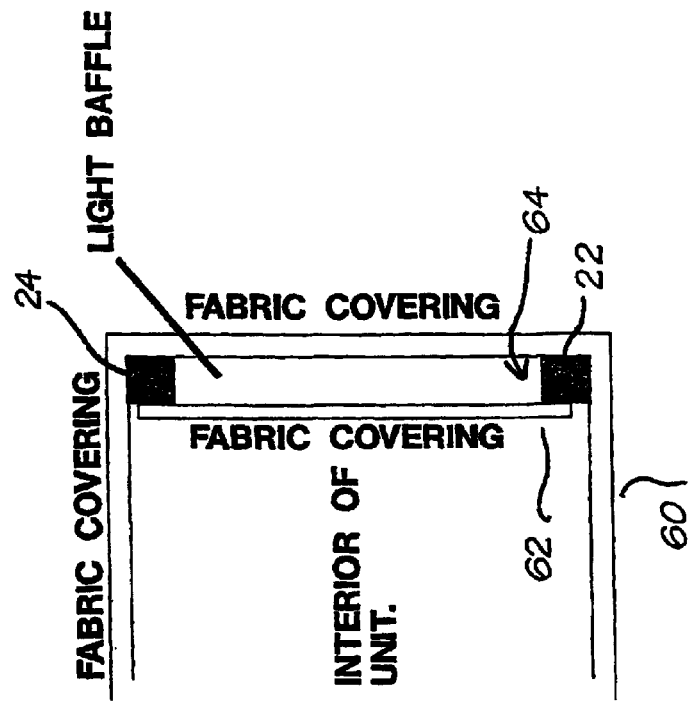
FIG. 7: shows additional light absorption baffles.
Figure 6:
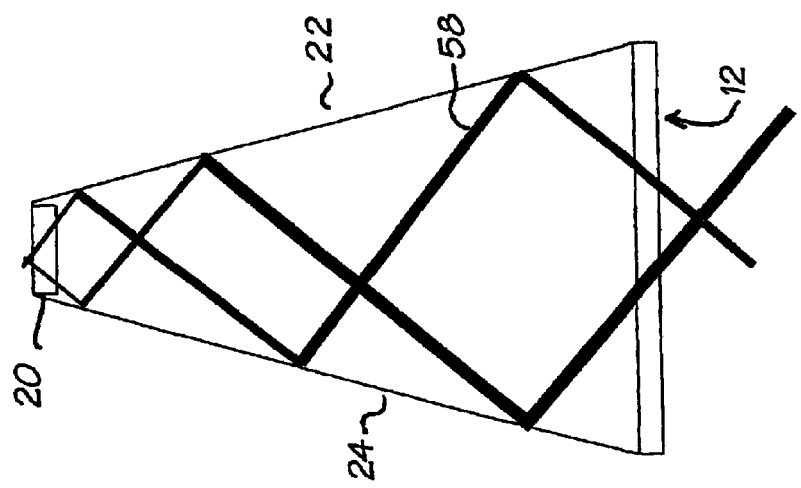
FIG. 6: shows the light absorption arrangement.

The benefits of the generally tapered pyramid shape of the frame in terms of light collection are shown in FIG. 6. Any light 58 entering the front of the screen 12 is directed towards the back of the unit towards the rear vertical section 20. This light direction is by a covering 60 which is supported by the frame 26 which thereby defines an enclosure. The covering is preferably a stretchy material which is stretched over the frame as this assists in changing the size and angles of the frame arms. The material can be stretched over the outside, or supported on the inside of the frame. As shown in FIG. 7, both an exterior covering 22 and interior 62 may be used.

A significant portion of all incoming ambient light is absorbed by the internal light absorbing system. This achieved through the pyramid shape of the unit in conjunction with light absorbing materials including the covering.

The shape of the unit ensures that any/all reflected light entering through the translucent screen, is automatically passed to the back of the unit. To assist in the trapping and absorption of all the incoming light a number of light absorbing baffles 64 are placed in front of, and along the length of the internal black fabric, along all four sides of the pyramid. These baffles, which are attached via Velcro comprise similar strips of black soft material which are placed randomly or regularly apart, along and all around the entire internal length of the unit. Thus all light being entering the unit is either reflected off the internal wall of the unit into a baffle, or is reflected back off the baffle towards the back of the unit, striking another wall and thus becoming trapped inside that baffle. At each surface, a portion of the light is absorbed so that the shape and baffles increase the amount of light absorbed.

As shown in FIG. 8, an additional light absorbing cone 66 is also used to encourage and ensure further light absorption. This additional light absorbing cone comprises a black perforated light weight black material which is stretched and hung along all the pyramid walls, to form a further smaller projection cone, which runs from the front of the lens of the projector to the back of the screen. This perforated cone is supported by elasticated wire, with all perforated walls terminating close to the lens cowling of the projector(s). This perforated material allows light to pass out of the direct projection area into the outer layer of the light absorbing material.

The translucent nature of the black perforated material allows light to pass into the light absorbing waste area. The black material creates a shadow reflection which helps to increase the overall rate of light absorption within the baffle area. Thus the increase in light absorption within the unit improves the overall contrast ratio and picture quality.

A further significant advantage is provided by combining the fabric covered unit with an air cooling fan 63 arranged to draw air over the projector and out of the unit as shown in FIG. 9. Since the entire unit is covered by a special black material which acts as fine air filter, all incoming air entering the unit from the outside is clean of all particles. The exhaust creates a low pressure area within the unit, and therefore air is drawn naturally into the unit via its large surface.

This clean air within the internal projection area not only ensure that there is no refraction of the projected light during its internal travel through the air to the screen by dust particles, but also ensures that perfectly clean air is always drawn into the projector(s) and this clean air more efficiently cools the optical system and projector lamps without depositing any detrimental material.

Although the material on the inside of the cover is always a soft dense black, the outside may be white or any other selected colour. The outside of the material used on outdoor systems is waterproof.

Lastly, a unit in use is shown in FIG. 10 which shows how the unit may be suspended from hanging points 68, or supported by leg supporting points 70.

A further light absorbing arrangement is shown in FIG. 11. This could be used in addition to, or in place of, the inner light absorbing cone 66. This comprises a black material 72 such as polystyrene or foam cut with a series of entry apertures 74, each leading to a generally conical light trap with an exit aperture 76, which is smaller than the entry aperture.

For purposes of identification I have named this new material the Lighteraser. Each Lighteraser is constructed from thick sections of either polystyrene boards (3" to 12"), or similar light weight materials such as foam etc. All boards are black.

These Lighteraser boards can be used with, or can replace the black perforated light weight fabric that formed the additional internal light cone, the boards being placed in the same position, running from the screen, at the front of the unit, back to the projection lens.

Like the light weight perforated material, the 4 light weight Lighteraser boards form the same basic internal cone/shaped many sided internal pyramid.

Each Lighteraser is constructed from a thick black polystyrene sheet of a chosen thickness, within which are constructed a series of one-way Lightblots, each Lightblot being internally, an off axis cone shaped tube, having a light entry point 74 and a light exit point 76 at the Lightgate.

Each Lightblot effectively provides a one way Black Hole, any unabsorbed light exiting from the Lightblot at the Lightgate. Each Lightblot comprises a circular round opening, or ellipse on the front edge of the Lighteraser, and is of a chosen diameter or cross section. As the "off axis" Lightblot passes through the board the diameter decreases at a chosen rate, to form an off axis cone which will absorb light. Any unabsorbed light exiting at the "Lightgate", a hole located the other end of the Lightblot. The Lightgate is also of a chosen reduced diameter or ellipse.

The Lightblots are not cut at 90° angle to the surface but are cut at any "off axis" diagonal angle of between 10° and 90°, (perpendicular) to the surface.

The Lighteraser is placed with the Lightblot Lightgates facing outwards towards the light absorbing zone and backwards towards the Projector.

Thus any incoming light will be reflected off the inside surface of one of the Lightblots, being reflected all the way down the cone shape of the Lightblot, with any unabsorbed light exiting at the small Lightgate (hole), passing directly into the light absorbing area. Alternatively, any incoming light will be reflected off the Lighteraser to the opposite Lighteraser, and will either pass into a Lightblot or will again be reflected across, eventually passing into a Lightblot.

Because all the exit points at the Lightgates are small round and elliptical holes, all facing towards the rear of the unit, none of the focused light exiting a Lightgate can be reflected back into, or up another Lightgate exit hole. Thus all light is completely trapped and absorbed in the light absorbing zone. To further ensure that no light can be reflected into a Lightgate there is a small raised mound to the front of the Lightgate, with a minimum equivalent height equal to the width of the Lightgate. This raised mound acts as a type of awning protecting the gate from any reflected light, and ensuring that no reflected light can enter back through the gate.

What is claimed is:

1. A rear projection unit comprising a screen for viewing from a front side and a frame attached at the rear side of the screen, the frame having a front portion proximate the screen and a rear portion away from the screen, the rear portion including a mounting for mounting a projector at a desired position in relation to the screen wherein the frame comprises a plurality of configurable arms, the arms comprising sliding sections to extend or reduce the length of the arms and being pivotably mounted to the screen at the front portions of the arms and to a rear section at the rear portion of the arms thereby being moveable to change the position of the mounting for the projector with respect to the screen.

2. A projection unit according to claim 1, wherein the rear section supports mounting.

3. A projection unit according to claim 1, wherein the arms are connected to the rear section at points defining a shape of the same aspect ratio as the points at which the arms are pivotably mounted to the screen.

4. A projection unit according to claim 1, wherein the screen and rear section are rectangular, and the points at which the arms are connected are corners of the rectangles.

5. A projection unit according to any of claim 1, wherein the mounting is supported by the rear section so that a projector mounted on the mounting is positioned centrally with respect to the screen when the arms are equal length.

6. The projection unit according to claim 1, wherein the frame is smaller at the rear portion than at the front portion.

7. The projection unit according to claim 1 comprising a tapered frame which tapers from the front portion to the rear portion.

8. A projection unit according to claim 1, wherein the frame is a truncated pyramid in shape.

9. A projection unit according to claim 1, wherein the unit includes a light absorbing material arranged to define a main cavity within the frame bordered by the screen at one side and the light absorbing material on other sides.

10. A projection unit according to claim 9, wherein the light absorbing material defines a cavity which tapers from the screen to the rear, whereby extraneous light within the cavity is directed to the rear of the unit away from the screen.

11. A projection unit according to claim 9, wherein the light absorbing material comprises a cloth with a dark inner side stretched over the frame.

12. A projection unit according to claim 9, further comprising one or more baffles arranged within the cavity for absorbing extraneous light and arranged away from the cone of light produced by a projector so as not to impede projection.

13. A projection unit according to claim 12, wherein the one or more baffles are attached to the inside of the frame.

14. The projection unit according to claim 12, wherein the one or more baffles are attached to the inside of the frame.

15. The projection unit according to claim 9, further comprising an extraction fan arranged to draw cooling air over a projector within the main cavity and to expel air from the cavity thereby drawing air into the main cavity through the light absorbing material, whereby the air passing over the projector is filtered through the light absorbing material.

16. The projection unit according to claim 12, further comprising one or more baffles arranged within the cavity for absorbing extraneous light and arranged away from the cone of light produced by a projector so as not to impede projection.

17. A rear projection unit comprising a screen for viewing from a front side and a frame attached at the rear side of the screen, the frame having a front portion proximate the screen and a rear portion away from the screen, the rear portion including a mounting for mounting a projector at a desired position in relation to the screen wherein the unit includes a light absorbing material arranged to define a main cavity within the frame bordered by the screen at one side and the light absorbing material on other sides and further comprising a second light absorbing material arranged to define an inner cavity within the main cavity bounded by the screen and the second light absorbing material, and having an aperture for receipt of the lens of a projector mounted outside the inner cavity, but within the main cavity.

18. The projection unit according to claim 17, wherein the second light absorbing material comprises a pyramid or cone suspended within the frame and the light absorbing material defining the main cavity comprises a cloth stretched over the frame.

19. The projection unit according to claim 18, wherein the second light absorbing material comprises a series of light traps arranged to absorb light within the inner cavity.

20. The projection unit according to claim 17, wherein the light absorbing material arranged to define the inner cavity comprises one or more light absorbing boards.

21. The projection unit according to claim 17, wherein the second light absorbing material comprises a cloth.

22. The projection unit according to claim 17, wherein the light absorbing material defining the main cavity comprises a cloth stretched over the frame.

23. The projection unit according to claim 17, wherein the light absorbing material comprises a cloth with a dark inner side stretched over the frame.

24. A rear projection unit comprising a screen for viewing from a front side and a frame attached at the rear side of the screen, the frame having a front portion proximate the screen and a rear portion away from the screen, the rear portion including a mounting for mounting a projector at a desired position in relation to the screen, wherein the unit includes a light absorbing material arranged to define a main cavity within the frame bordered by the screen at one side and the light absorbing material on other sides and further comprising an extraction fan arranged to draw cooling air over a projector within the main cavity and to expel air from the cavity thereby drawing air into the main cavity through the light absorbing material, whereby the air passing over the projector is filtered through the light absorbing material.

25. A light absorption arrangement comprising a generally light absorbing material having a plurality of first openings on a first surface each communicating with a second smaller opening in a second surface, and having an internal surface between each first and second opening, whereby at least a portion of flight impinging on the first surface passes one or more first openings, is partially absorbed and partially reflected on the internal surface and directed by the internal surface out of the second smaller opening.

26. The light absorption material according to claim 25, wherein each first opening, second opening and internal surface forms a generally conical shape.

27. A cavity comprising the material according to claim 25, in which the first surface of the material is arranged on the inner side, thereby absorbing light within the cavity end directing unabsorbed light out of the cavity.

\* \* \* \* \*